US011227444B2

(12) United States Patent
Silverstein et al.

(10) Patent No.: US 11,227,444 B2
(45) Date of Patent: Jan. 18, 2022

(54) VIRTUAL REALITY CONTENT ADAPTATION

(71) Applicant: International Business Machines Corporation, Armonk, NY (US)

(72) Inventors: Zachary A. Silverstein, Jacksonville, FL (US); Jeremy R. Fox, Georgetown, TX (US); Sarbajit K. Rakshit, Kolkata (IN); Uri Kartoun, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/812,878

(22) Filed: Mar. 9, 2020

(65) Prior Publication Data
US 2021/0279963 A1 Sep. 9, 2021

(51) Int. Cl.
*G06T 19/00* (2011.01)
*G09G 3/00* (2006.01)
*G16Y 10/55* (2020.01)
*G16Y 10/65* (2020.01)

(52) U.S. Cl.
CPC ........... *G06T 19/006* (2013.01); *G09G 3/003* (2013.01); *G06T 2200/24* (2013.01); *G06T 2219/024* (2013.01); *G16Y 10/55* (2020.01); *G16Y 10/65* (2020.01)

(58) Field of Classification Search
None
See application file for complete search history.

(56) References Cited

U.S. PATENT DOCUMENTS

| 10,671,241 | B1* | 6/2020 | Jia ........................ G06F 3/04815 |
| 2011/0128555 | A1* | 6/2011 | Rotschild ................ G06F 3/017 356/625 |
| 2011/0191707 | A1 | 8/2011 | Lee |
| 2014/0152558 | A1 | 6/2014 | Salter |
| 2018/0284692 | A1 | 10/2018 | Kline |
| 2018/0321816 | A1 | 11/2018 | Bostick |
| 2019/0043447 | A1* | 2/2019 | Chung ................ G06F 3/04815 |
| 2019/0114802 | A1* | 4/2019 | Lazarow ................. G06F 1/163 |
| 2019/0164299 | A1 | 5/2019 | Rakshit |
| 2019/0187875 | A1 | 6/2019 | Kline |

(Continued)

FOREIGN PATENT DOCUMENTS

KR 101348195 B1 1/2014

OTHER PUBLICATIONS

"Microsoft HoloLens," Microsoft, 2019, 5 pages.
(Continued)

*Primary Examiner* — Tize Ma
(74) *Attorney, Agent, or Firm* — VanLeeuwen & VanLeeuwen; Alexander G. Jochym

(57) ABSTRACT

An approach is provided in which the approach establishes a communication link between a virtual reality device and a hologram system. The hologram system projects a hologram in a physical world and the virtual reality device projects a corresponding virtual hologram in a virtual world. The virtual reality device adjusts the virtual hologram based on request from a user operating the virtual reality device and the approach instructs the hologram system to adjust the hologram in a manner similar to the adjustments to the virtual hologram.

20 Claims, 9 Drawing Sheets

(56) References Cited

U.S. PATENT DOCUMENTS

2019/0196404 A1 6/2019 Bostick
2019/0227487 A1 7/2019 Kline

OTHER PUBLICATIONS

Carter, "Forget 3D: holograms are coming to smartphones," TechRadar, Jun. 2016, 13 pages.
"What is Holography," Holocenter, 2019, 12 pages.
"Sci-fi holograms a step closer with tiny invention," Australian National University, Jan. 2017, 2 pages.
Zyga, "High-efficiency color holograms created using a metasurface made of nanoblocks," Phys.org, Jul. 2016, 2 pages.
Tung, "Microsoft just opened a hologram studio for VR and AR content," ZDNet, Oct. 2017, 16 pages.
Katharina, "HOLOGATE BLITZ: HOLOGATE reveals revolutionary new product at IAAPA Orlando!" HOLOGATE, Sep. 2019, 4 pages.

* cited by examiner

VIRTUAL REALITY CONTENT ADAPTATION

BACKGROUND

Virtual reality (VR) is an artificial, computer-generated simulation or recreation of a real life environment or situation that immerses a user into a virtual world by making the user feel like the user is experiencing a simulated reality firsthand. Some virtual reality applications include entertainment and education. At times, users capture experiences using multiple cameras that are aligned to capture a complete 360 degree view.

Today's virtual reality systems use virtual reality headsets or multi-projected environments to generate realistic images, sounds, and other sensations that simulate a user's presence in a virtual environment. A person using virtual reality equipment is able to view the virtual world, move around the virtual world, and interact with virtual features or items.

Holography is the science and practice of creating holograms. A hologram is a physical recording of an interference pattern which uses diffraction to reproduce a three-dimensional light field, resulting in an image that retains the depth and other properties of an object. When suitably lit, the interference pattern diffracts the light into an accurate reproduction of the original light field and exhibits visual depth cues such as parallax and perspective that change realistically with the relative position of an observer. As a result, an observer is able to view a hologram of an object from different angles and the hologram represents the actual object viewed from similar angles. In this sense, holograms do not simply produce an illusion of depth but are truly three-dimensional images.

BRIEF SUMMARY

According to one embodiment of the present disclosure, an approach is provided in which the approach establishes a communication link between a virtual reality device and a hologram system. The hologram system projects a hologram in a physical world and the virtual reality device projects a corresponding virtual hologram in a virtual world. The virtual reality device adjusts the virtual hologram based on a request from a user operating the virtual reality device and the approach instructs the hologram system to adjust the hologram in a manner similar to the adjustments to the virtual hologram.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
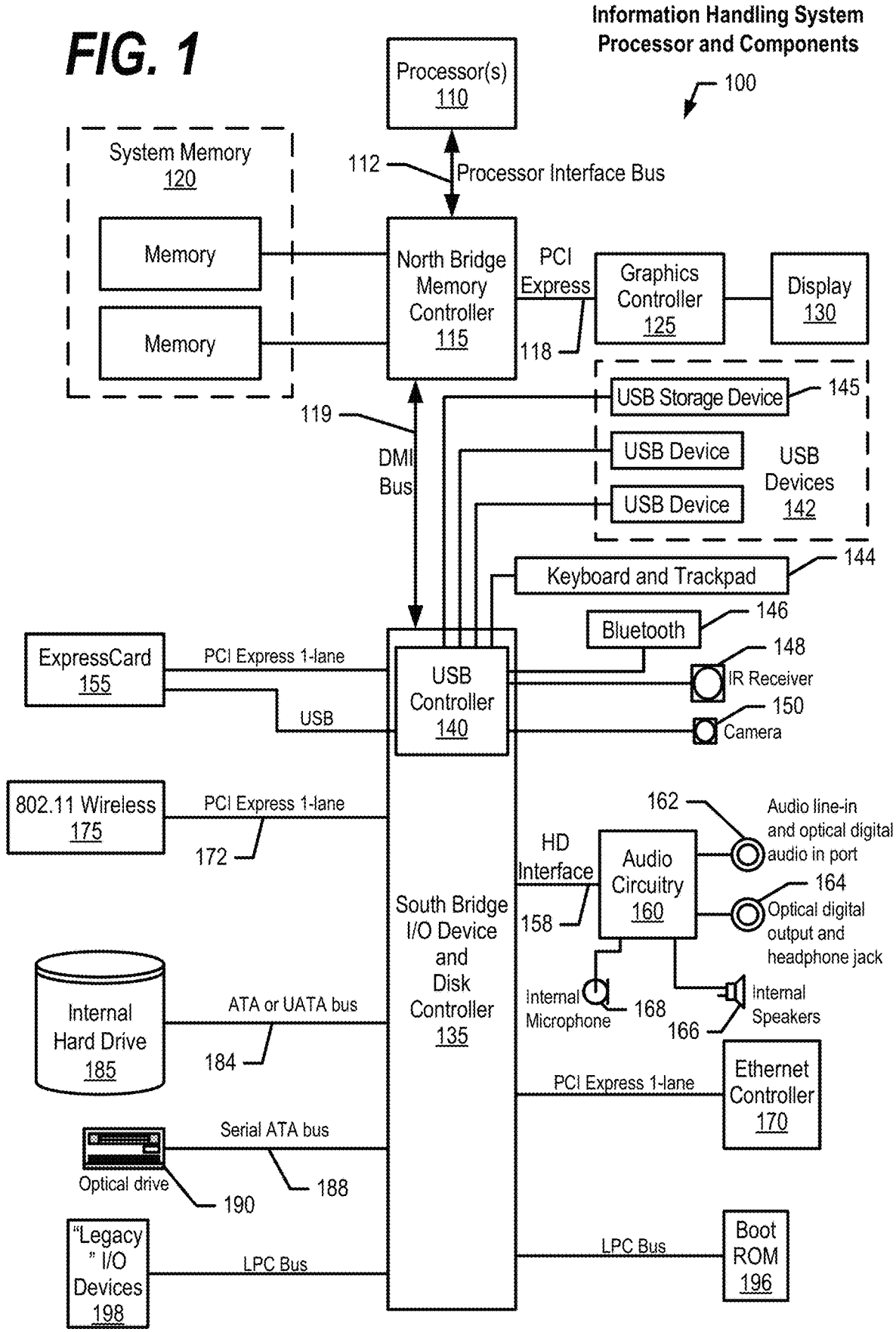
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119.

In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
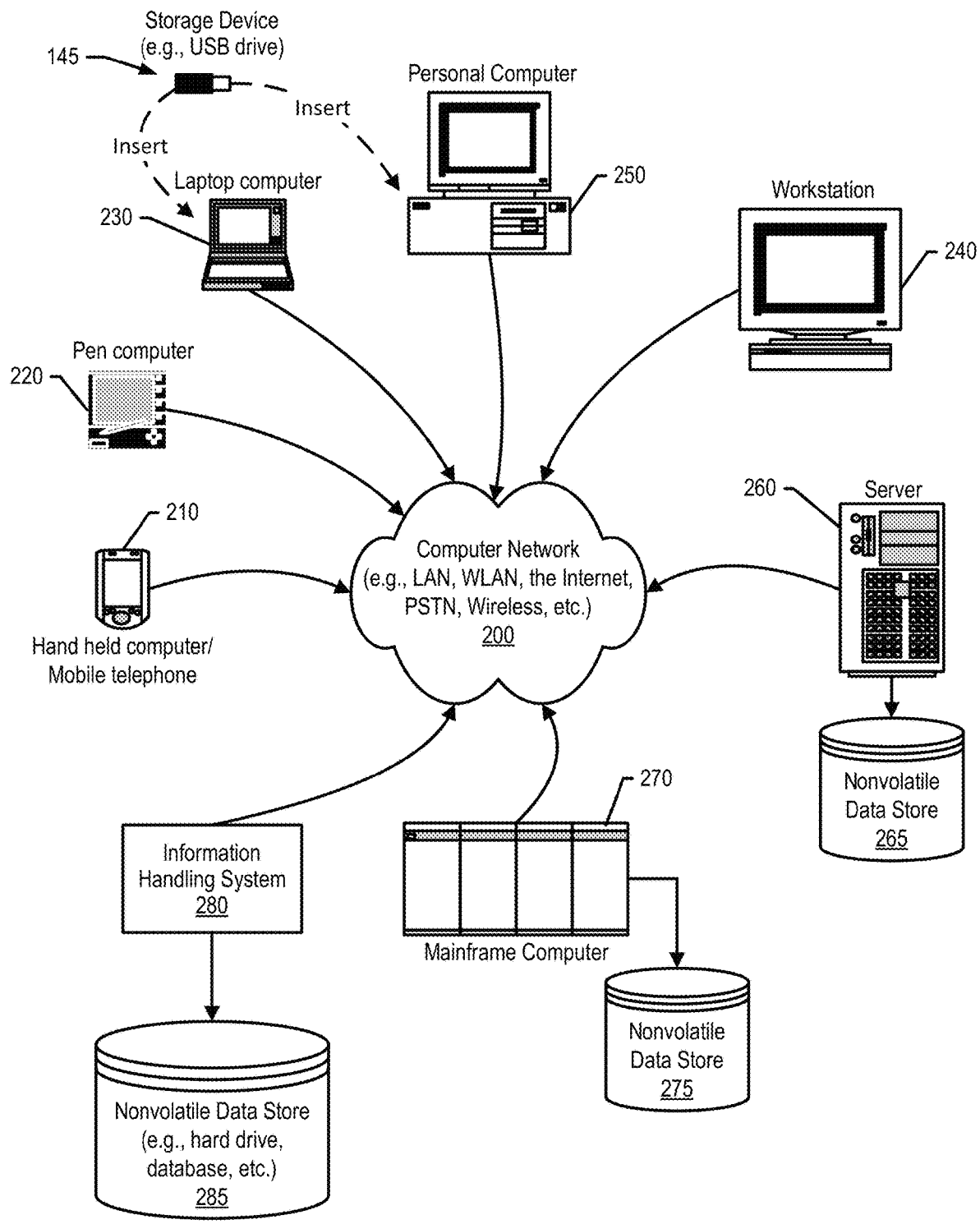
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, a user using virtual reality equipment is able to view a virtual world, move around the virtual world, and interact with virtual features or items. A challenge found is that when a user interacts with a virtual world, the user is disconnected from the physical world. As such, if a holographic image is created in the physical world with light diffusion techniques, then observers in the surrounding area are able to view the holographic image but a virtual reality system does not recognize the hologram.

To resolve the challenges discussed herein, FIGS. 3 through 9 depict an approach that can be executed on an information handling system that establish a connection between a virtual reality (VR) device and a hologram system to display and synchronize in real time a virtual hologram in a virtual world based a hologram displayed in a physical world. In addition, the approach receives adjustments from a VR user for the virtual hologram and performs the same adjustments to the hologram in the physical world using the holographic object creation device. Similarly, the approach receives adjustments to the hologram from audience members in the physical world and performs the same adjustments to the virtual hologram in the virtual world.

Figure 3:
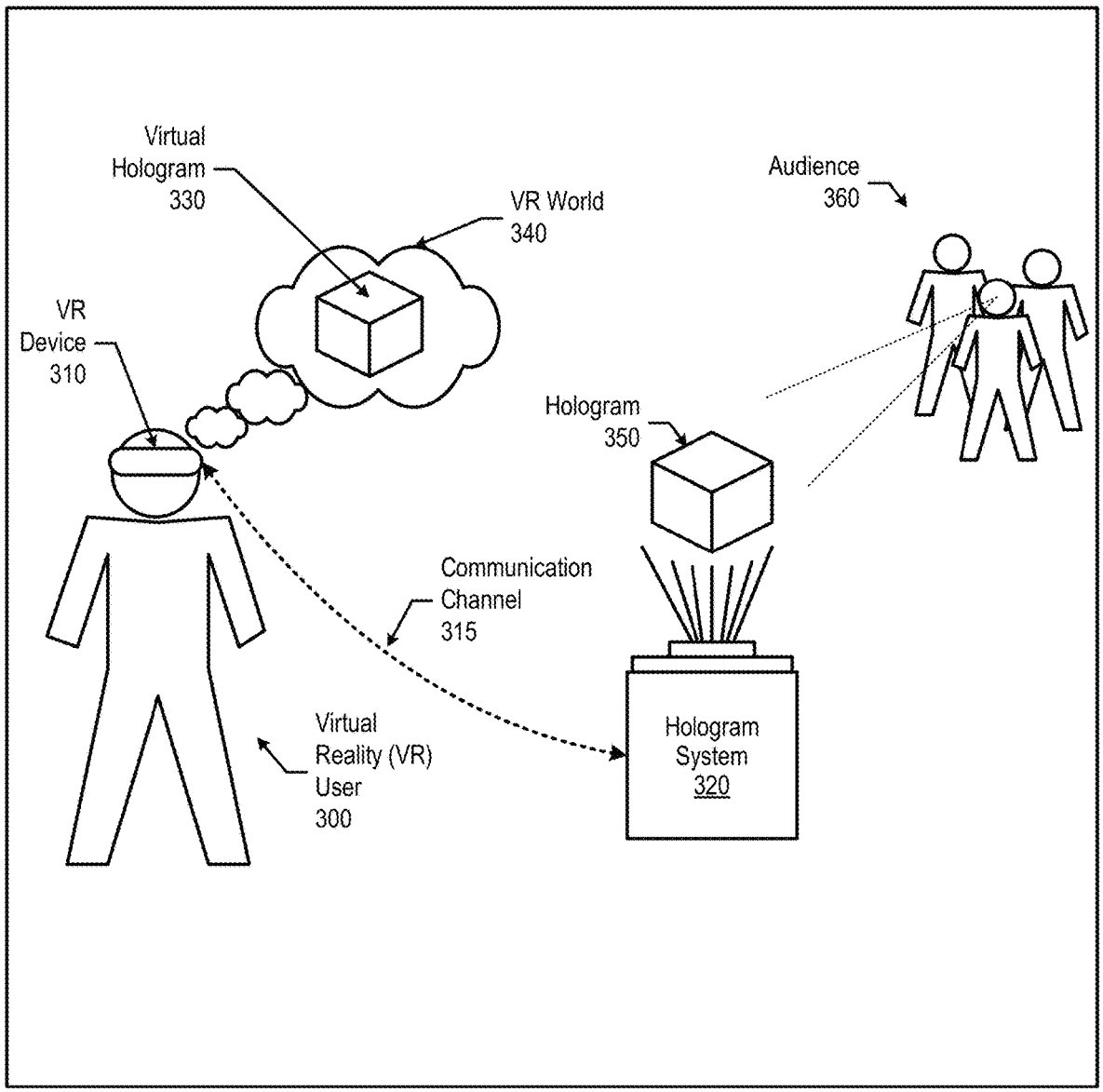
FIG. 3 depicts an exemplary diagram showing a hologram system displaying a hologram in a physical world and a virtual reality device displaying a corresponding virtual hologram in a virtual world.

FIG. 3 depicts an exemplary diagram showing a hologram system displaying a hologram in a physical world and a virtual reality device displaying a corresponding virtual hologram in a virtual world. Virtual reality (VR) user 300 wears VR device 310 that displays VR world 340 to VR user 300. VR device 310 connects to hologram system 320 via communication channel 315. In one embodiment, hologram system 320 is in proximity to VR user 300, such as in the same room. In another embodiment, hologram system 320 is not in proximity to VR user 300. In both embodiments, VR device 310 and hologram system 320 establish communication channel 315 to communicate with each other using the appropriate communication technology (Bluetooth, WiFi, cellular network, Internet, etc.).

Hologram system 320 displays hologram 350 in midair and is visible by audience 360. Audience 360 may be one or more observers that are in physical proximity to hologram system 320. Hologram system 320 sends hologram information to VR device 310 over communication channel 315 that describes hologram 350. In turn, VR device 310 displays virtual hologram 330 in VR world 340 for VR user 300 to view. In one embodiment, a third-party system controls communication between VR device 310 and hologram system 320.

In one embodiment, VR device 310 receives adjustments from hologram system 320 to hologram 350 and adjusts virtual hologram 330 accordingly so that the adjustments to hologram 350 are adapted to virtual hologram 330 in VR world 340. For example, one of audience 360's members may resize hologram 350 and/or move hologram system 320 to a different part of a room. In this embodiment, hologram system 320 informs VR device 310 of the adjustments and VR device 310 adjusts virtual hologram 330 accordingly (see FIG. 7 and corresponding text for further details).

Likewise, hologram system 320 receives adjustments from VR device 310 to virtual hologram 330 and adjusts hologram 350 accordingly so that the adjustments of virtual hologram 330 are adapted to hologram 350 in in the physical world for audience 360 to view. For example, VR user 300 may resize virtual hologram 330 and/or move virtual hologram 330 to a different part of a virtual room in VR world 340. In this embodiment, VR device 310 informs hologram system 320 of the adjustments and hologram system 320 adjusts hologram 350 accordingly, such as by resizing hologram 350 and/or by using a self-propelling mechanism of which hologram system 320 is placed on top to move around a room (see FIG. 6 and corresponding text for further details).

Figure 4:
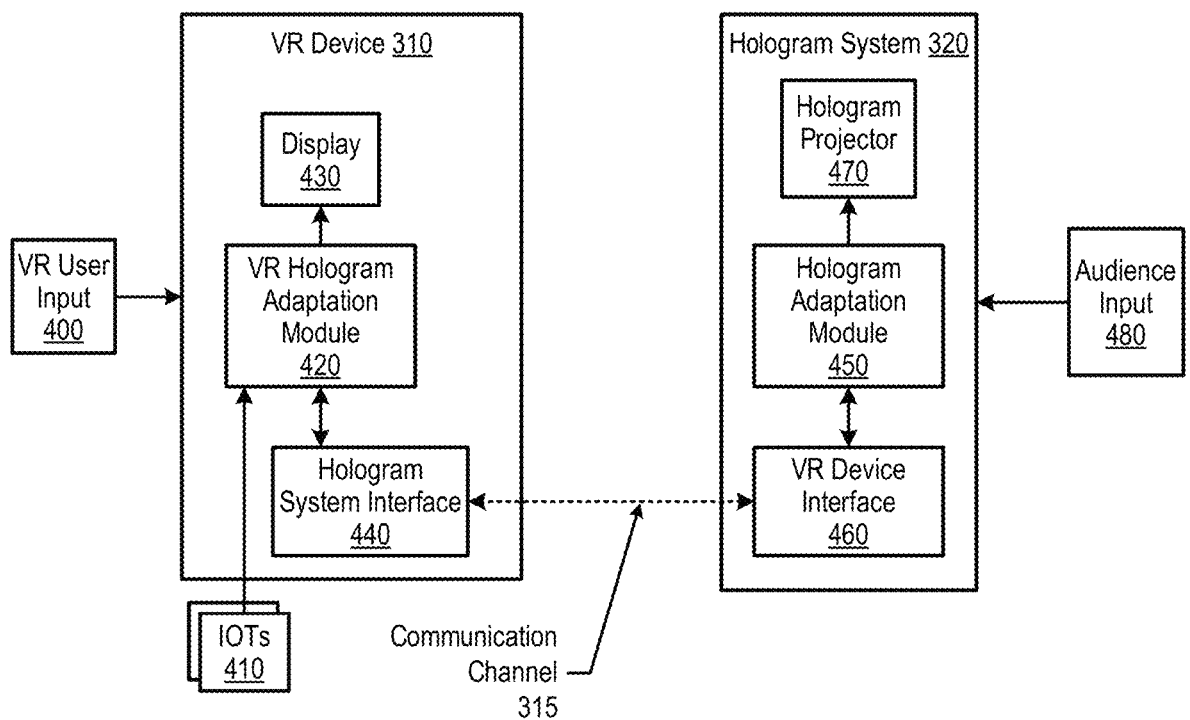
FIG. 4 depicts an exemplary diagram showing functional blocks of a virtual reality device and a hologram system.

FIG. 4 depicts an exemplary diagram showing functional blocks of a virtual reality device and a hologram system. VR device 310, in one embodiment, is a head mounted device that includes display 430 to display VR world 340 to VR user 300. VR device 310 also includes VR hologram adaptation module 420 that adds virtual hologram 330 to VR world 340 based on interaction with hologram system 320.

VR device 310 includes hologram system interface 440 that interacts with hologram system 320. Hologram system interface 440 also includes a wireless transceiver to communicate through a wireless network such as a Bluetooth, WiFi, cellular network, etc. VR device 310 receives VR user input 400 from VR user 300, uses VR hologram adaptation module 420 to adjust virtual hologram 330, and sends the adjustments to hologram system 320 via hologram system interface 440 over communication channel 315.

In one embodiment, VR device 310 receives input from Internet of Things (IOT) devices 410. For example, VR device 310 may ingest a mapping of a physical room from IOTs 410 and then utilize known artifact placement art to assist VR user 300 in the placement of components needed to render hologram 350 in the physical world.

Hologram system 320 is a computing system that computes hologram 350's shape, dimension, movement patterns, etc., and projects hologram 350 midair via hologram projector 470. Hologram projector 470 diffuses light in the surrounding area to create hologram 350. In one embodiment, hologram system 320 may be VR user 300's smart watch that moves with VR user 300.

Hologram system 320 also includes hologram adaptation module 450. Hologram adaptation module 450 uses VR device interface 460 to send/receive hologram adjustments to/from VR device 310 over communication channel 315. Hologram system 320 receives audience input 480 from audience 360, such as moving hologram system 320 to a different location or instructing hologram system 320 to resize hologram 350. Hologram system 320, in turn, sends the adjustments to VR device 310 via VR device interface 440 over communication channel 315.

Figure 5:
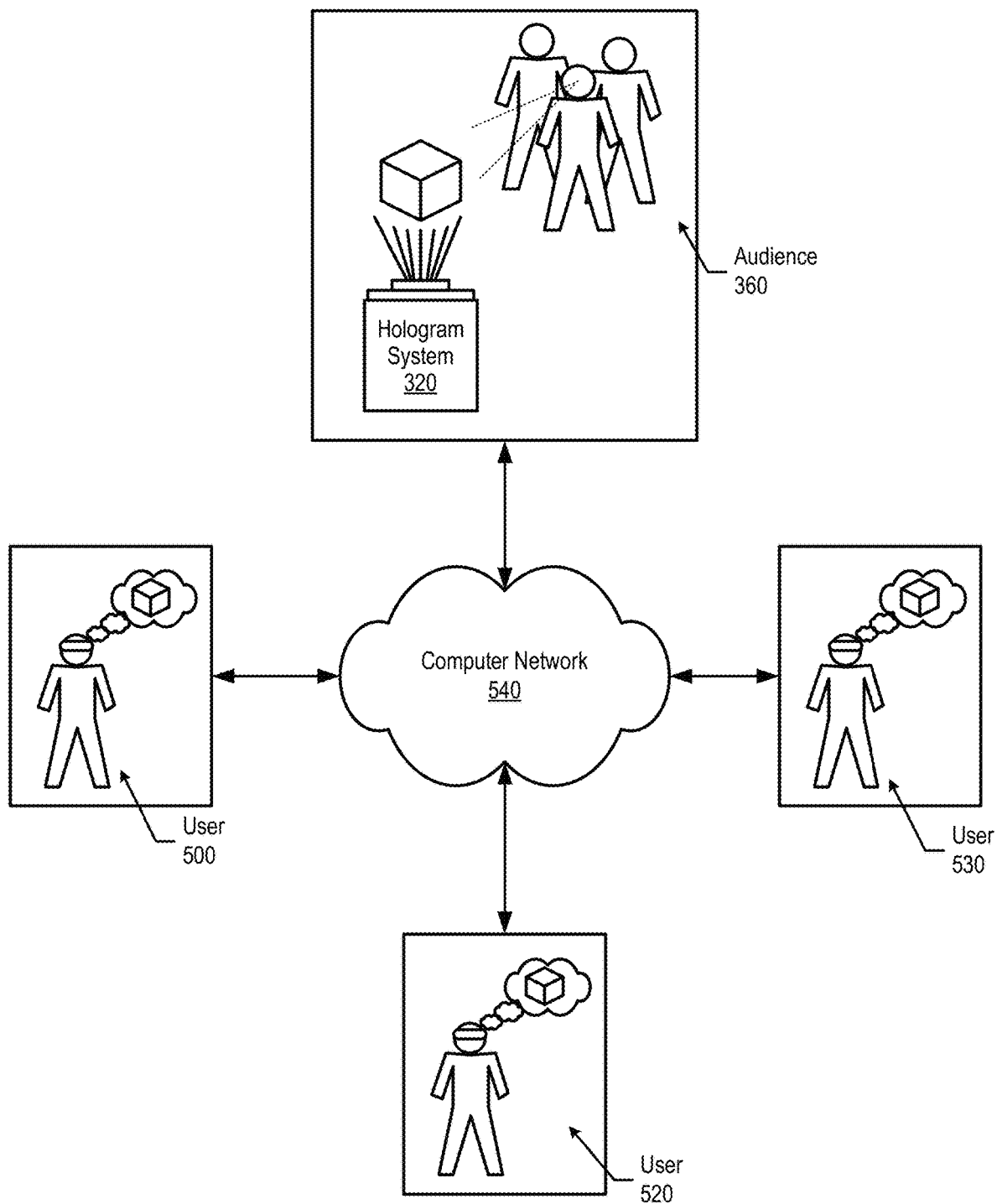
FIG. 5 depicts an exemplary diagram showing multiple virtual users using virtual reality devices to interact with a hologram system.

FIG. 5 depicts an exemplary diagram showing multiple virtual users using virtual reality devices to interact with a hologram system. In one embodiment, the approach discussed herein uses social promotion of real time dynamic interaction. In this embodiment, multiple virtual users 500, 520, and 530 interact with audience 360 through social collaboration via computer network 540. In this embodiment, hologram system 320 interacts with the multiple virtual users' VR devices to exchange adjustments discussed herein and concurrently display hologram 350 with their corresponding virtual holograms 330.

Figure 6:
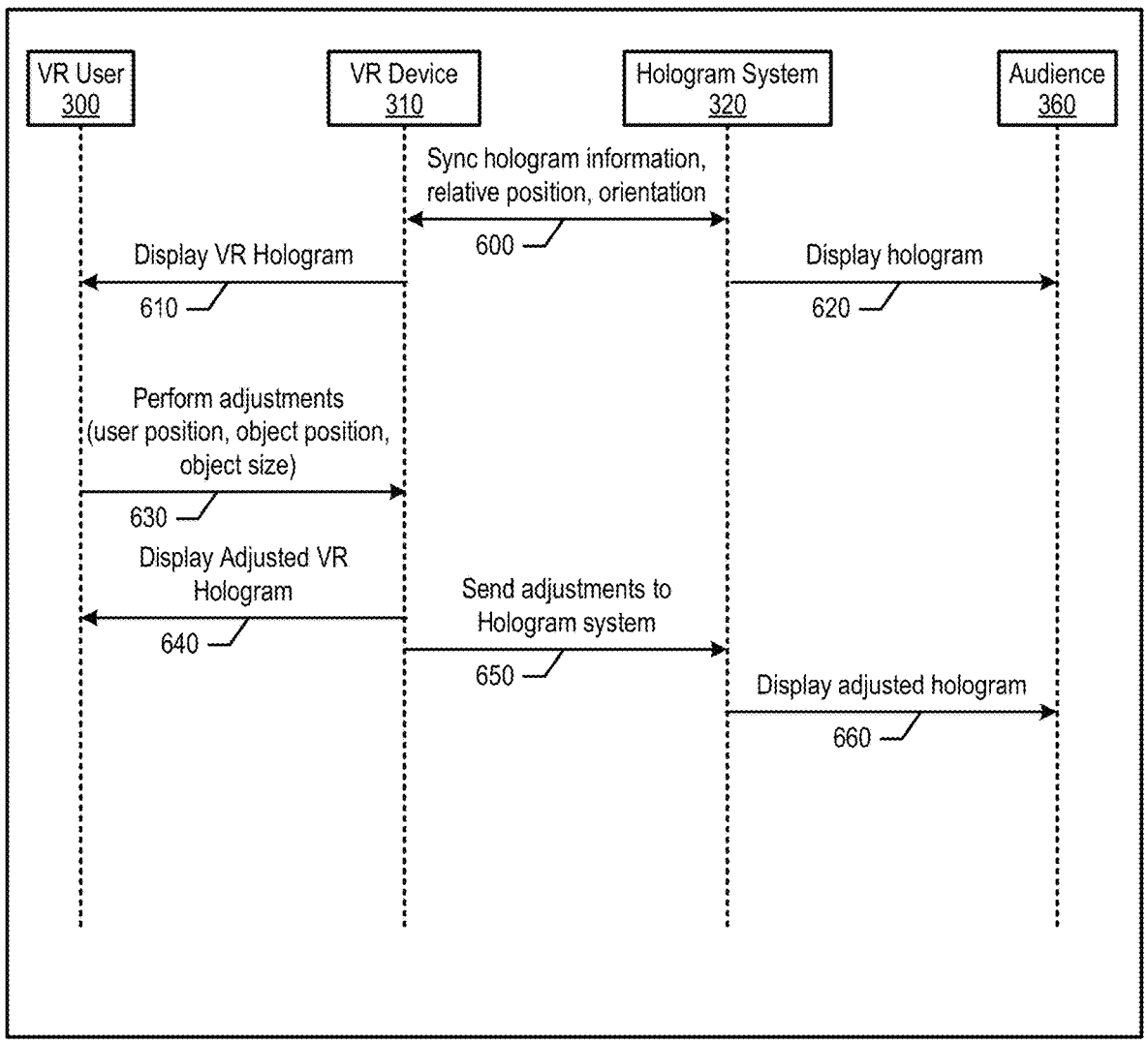
FIG. 6 depicts an exemplary diagram showing a virtual reality device receiving virtual hologram adjustments from a virtual reality user and sending the adjustments to a hologram system.

FIG. 6 depicts an exemplary diagram showing a virtual reality device receiving virtual hologram adjustments from a virtual reality user and sending the adjustments to a hologram system to perform corresponding hologram adjustments.

VR device 310 and hologram system 320 establish a communication link and synchronize hologram information (600). For example, hologram system 320 may provide VR device 310 with relative position, size, and orientation information of hologram 350. In turn, VR device 310 displays virtual hologram 330 in virtual realty world 340 (610) and hologram system 320 concurrently displays hologram 350 in the physical world for audience 360 to view (620).

VR device 310 receives virtual hologram adjustments from VR user 300, such as adjustments to virtual hologram 330's size and/or location in VR world 340 (630). In turn, VR device 310 displays the adjusted virtual hologram to VR user 300 accordingly (640). Concurrently, VR device 310 sends the virtual hologram adjustments to hologram system 320 (650), which in turn adjusts hologram 350 in a similar manner (660). As a result, virtual hologram 330 is in sync with hologram 350 from an appearance standpoint to VR user 300 and audience 360.

Figure 7:
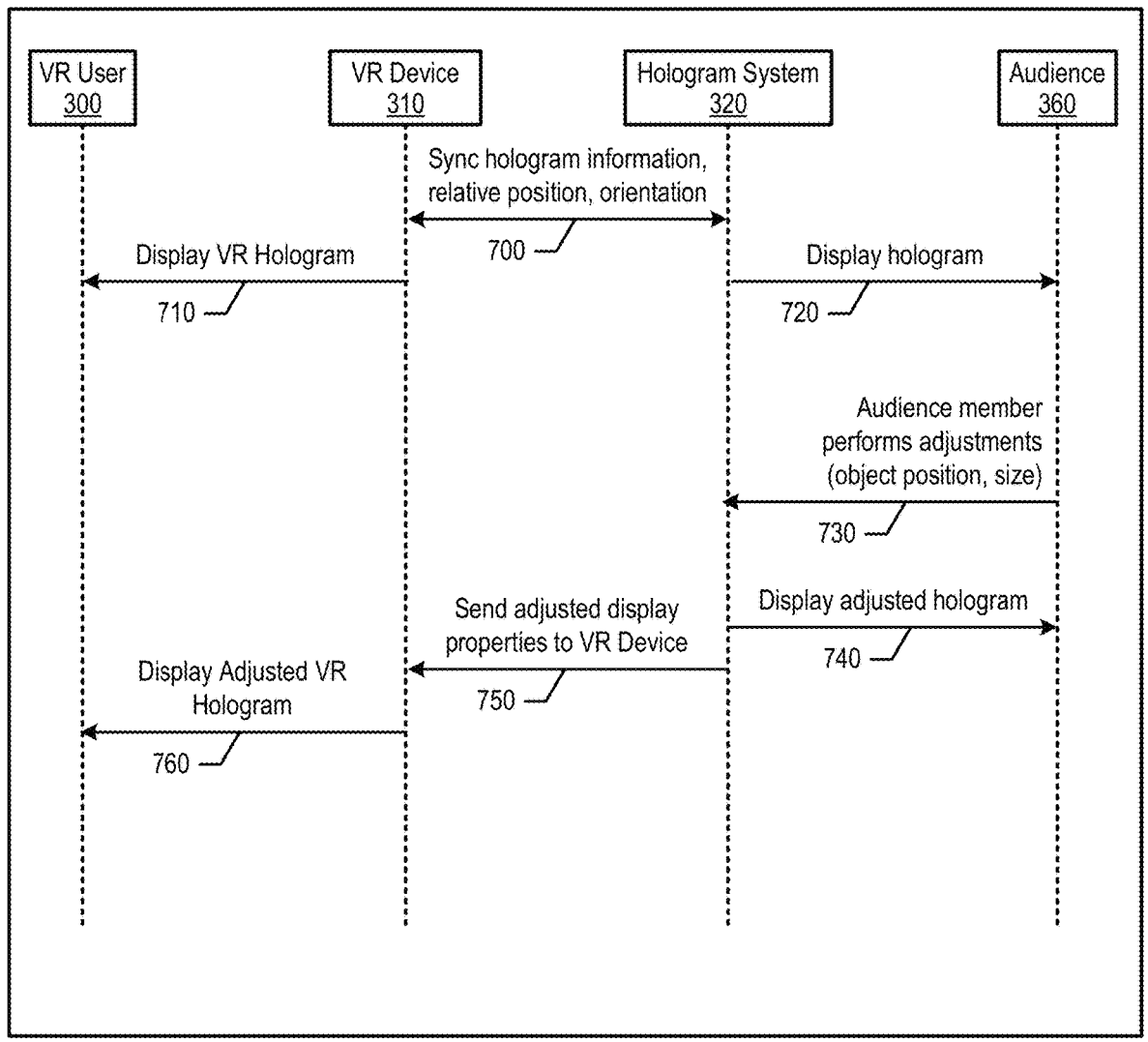
FIG. 7 depicts an exemplary diagram showing a hologram system receiving hologram adjustments from an audience member and sending the adjustments to a virtual reality device.

FIG. 7 depicts an exemplary diagram showing a hologram system receiving hologram adjustments from an audience member and sending the adjustments to a virtual reality device to perform corresponding virtual hologram adjustments.

VR device 310 and hologram system 320 establish a communication link and synchronize hologram information as discussed herein (700). In turn, VR device 310 displays virtual hologram 330 in virtual realty world 340 (710) and hologram system 320 displays hologram 350 in the physical world for audience 360 to view (720).

Hologram system 320 receives hologram adjustments from audience 360, such as adjusting the location of hologram system 320 to a different part of the room and/or adjusting the size of hologram 350 (730). In turn, hologram system 320 displays the adjusted hologram 350 to audience 360 (740). Concurrently, hologram system 320 sends the hologram adjustments to VR device 310 (750), which in turn adjusts virtual hologram 330 in a similar manner (760). As a result, hologram 350 is in sync with virtual hologram 330 as discussed herein.

Figure 8:
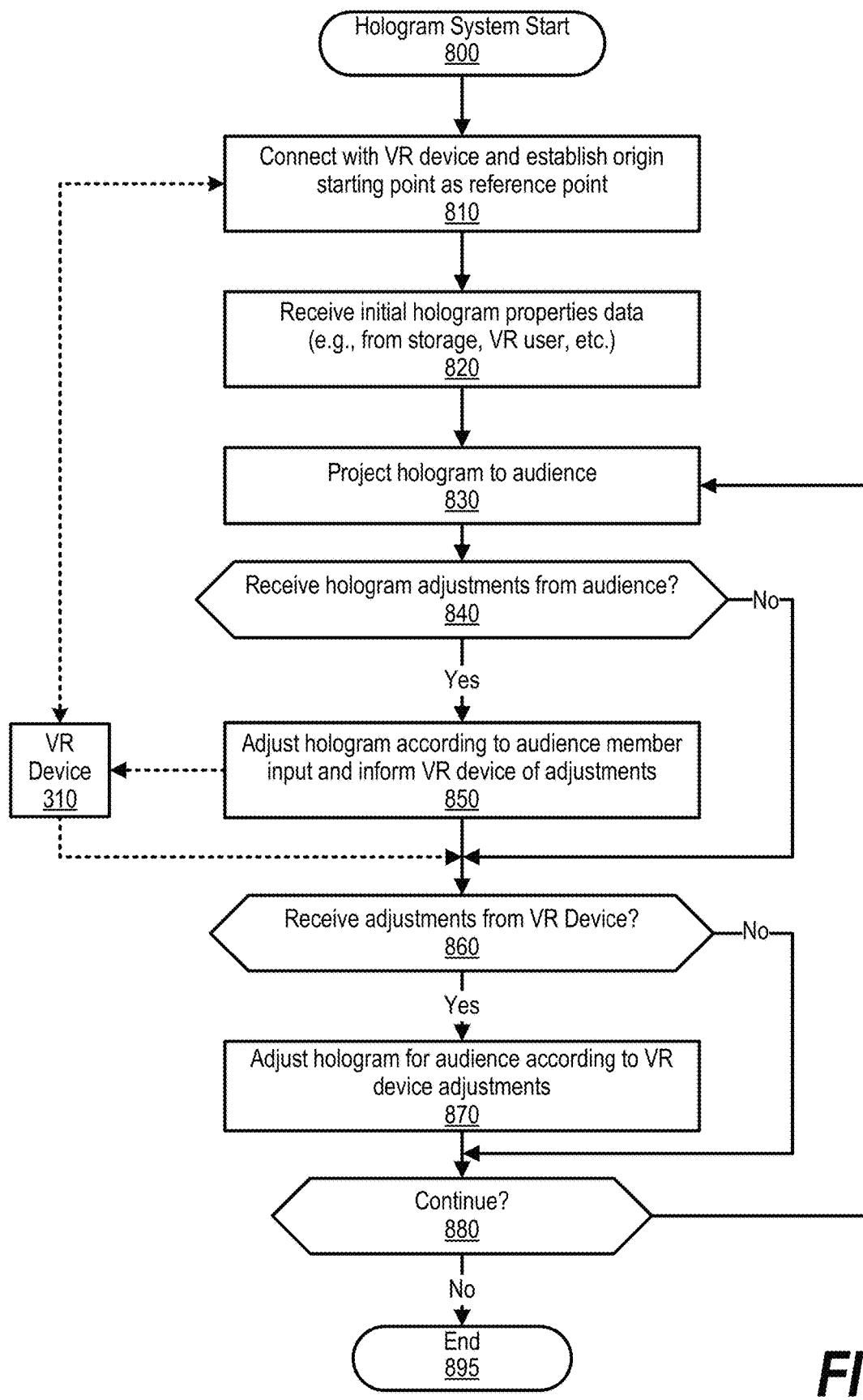
FIG. 8 depicts an exemplary flowchart showing steps taken by a hologram system to interact with a virtual reality device.

FIG. 8 depicts an exemplary flowchart showing steps taken by a hologram system to interact with a virtual reality device. FIG. 8 processing commences at 800 whereupon, at step 810, hologram system 320 connects with VR device 310 and establishes an origin starting point as reference point. For example, VR user 300 walks by hologram system 320 and hologram system 320 connects to VR device 310.

At step 820, hologram system 320 receives initial hologram properties data (e.g., from storage, VR user, etc.), such as relative position, size, and orientation information. At step 830, hologram system 320 projects the hologram to audience 360. Hologram system 320 determines as to whether hologram system 320 receives hologram adjustments from audience 360, such as audience 360 adjusting the location of hologram system 360 or adjusting the size of hologram 350 (decision 840). If hologram system 320 receives hologram adjustments from audience 360, then decision 840 branches to the 'yes' branch whereupon, at step 850, hologram system 320 adjusts hologram 350 according to audience member input and informs VR device 310 of adjustments. VR device 310 then adjusts virtual hologram 330 accordingly (see FIG. 9 and corresponding text for further details). On the other hand, if hologram system 320 does not receive hologram adjustments from audience 360, then decision 840 branches to the 'no' branch bypassing step 850.

Hologram system 320 determines as to whether hologram system 320 receive adjustments from VR Device 310, such as when VR user 300 adjusts the position or size of virtual hologram 330 (decision 860). If hologram system 320 receives adjustments from VR device 310, then decision 860 branches to the 'yes' branch whereupon, at step 870, hologram system 320 adjusts hologram 350 accordingly for audience 360's viewing. For example, VR use 300 may shrink the size of virtual hologram 330 and hologram system 320 therefore shrinks the size of hologram 350. On the other hand, if hologram system 320 does not receive adjustments from VR device 310, then decision 860 branches to the 'no' branch bypassing step 870.

Hologram system 320 determines as to whether to continue (decision 880). If hologram system 320 should continue, then decision 880 branches to the 'yes' branch which loops back to continue projecting hologram 350 and monitoring the communication link with VR device 310. This looping continues until hologram system 320 should terminate processing, at which point decision 880 branches to the 'no' branch exiting the loop. FIG. 8 processing thereafter ends at 895.

Figure 9:
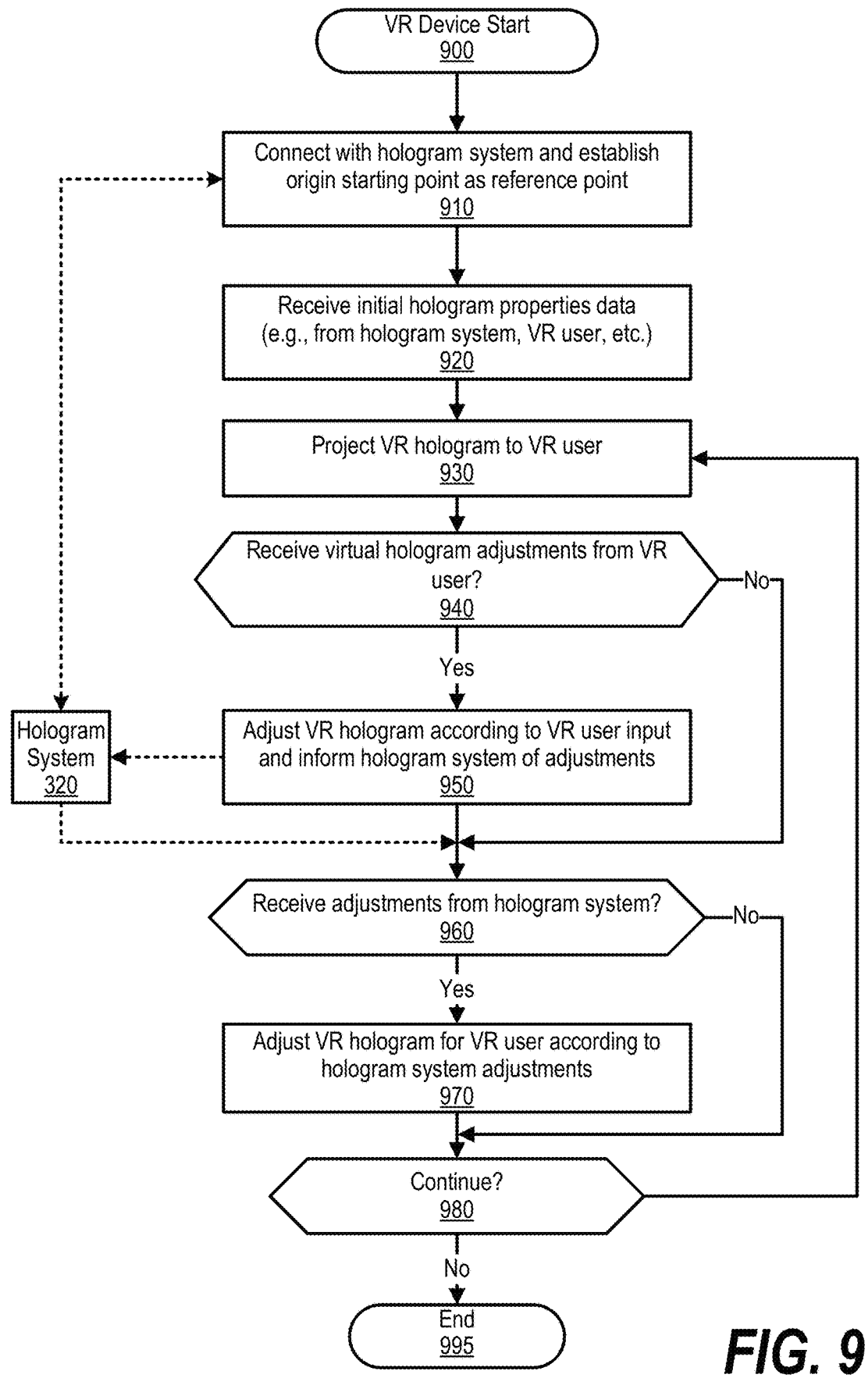
FIG. 9 depicts an exemplary flowchart showing steps taken by a virtual reality device to interact with a hologram system.

FIG. 9 depicts an exemplary flowchart showing steps taken by a virtual reality device to interact with a hologram system. FIG. 9 processing commences at 900 whereupon, at step 910, VR device 310 connects with hologram system 320 and establishes an origin starting point as a reference point. For example, VR user 300 walks by hologram system 320 and hologram system 320 connects to VR device 310.

At step 920, VR device 310 receives initial hologram properties data (e.g., from hologram system, VR user, etc.) and, at step 930, VR device 310 projects virtual hologram 330 to VR user 300. VR device 310 determines as to whether it receives virtual hologram adjustments from VR user 310, such as VR user 300 adjusting the size of virtual hologram 330 or moving virtual hologram 330 in virtual world 340 (decision 940). Continuing with the example above, VR user 300 adjusts the size, color, and tilt of VR hologram 330 inside VR world 340.

If VR device 310 receives virtual hologram adjustments from VR user 300, then decision 940 branches to the 'yes' branch whereupon, at step 950, VR device 310 adjusts virtual hologram 330 according to VR user 300's input and informs hologram system 320 of the adjustments. Hologram system 320, in turn, performs similar adjustments to hologram 350 (see FIG. 8 and corresponding text for further details). Using the example above, hologram system 320 receives the adjustments from VR device 310 and adjusts hologram 350 to duplicate VR hologram 330's adjustments.

On the other hand, if VR device 310 does not receive virtual hologram adjustments from VR user 310, then decision 940 branches to the 'no' branch bypassing step 950. VR device 310 determines as to whether it receives adjustments from hologram system 320 (decision 960). If VR device 310 receives adjustments from hologram system 320, then decision 960 branches to the 'yes' branch whereupon, at step 970, VR device 310 adjusts virtual hologram 330 for VR user 300 according to hologram system 320's received adjustments. On the other hand, if VR device 310 does not receive adjustments from hologram system 320, then decision 960 branches to the 'no' branch bypassing step 970.

VR device 310 determines as to whether to continue processing (decision 980). If VR device 310 should continue processing, then decision 980 branches to the 'yes' branch which loops back to continue to project virtual hologram 330 and maintain the communication link with hologram system 320. This looping continues until VR device 310 terminates, at which point decision 980 branches to the 'no' branch exiting the loop. FIG. 9 processing thereafter ends at 995.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

establishing a communication link between a virtual reality device and a hologram system, wherein the virtual reality device projects a virtual hologram in a virtual world viewable to a first user operating the virtual reality device, and the hologram system projects a hologram corresponding to the virtual hologram in a physical world viewable to a second user;

receiving a request from the first user operating the virtual reality device to adjust the virtual hologram;

adjusting, by the virtual reality device, the virtual hologram in the virtual world; and sending a set of instructions from the virtual reality device to the hologram system that instructs the hologram system to adjust the hologram in the physical world based upon the adjusting of the virtual hologram, wherein the adjusted hologram is viewable by the second user.

2. The method of claim 1 further comprising:

re-adjusting the hologram in the physical world by the hologram system based on a re-adjustment request initiated by the second user; and sending a different set of instructions from the hologram system to the virtual reality device that instructs the virtual reality device to re-adjust the virtual hologram based upon the re-adjusting of the hologram.

3. The method of claim 1 further comprising:

resizing the virtual hologram by the virtual reality device; and resizing the hologram by the hologram system in proportion to the resizing of the virtual hologram by the virtual reality device.

4. The method of claim 3 further comprising a plurality of virtual reality devices each displaying one of a plurality of corresponding virtual holograms, and where each of the plurality of virtual reality devices resize their corresponding one of the plurality of corresponding virtual holograms.

5. The method of claim 1 further comprising:

receiving a mapping of the physical world from a set of internet of things (IoT) devices; and generating the virtual world based on the received mapping.

6. The method of claim 1 further comprising:

identifying a physical reference point of the hologram in the physical world;

utilizing the reference point and a virtual position of the first user in the virtual world to establish a virtual reference point in the virtual world; and displaying the virtual hologram in the virtual world at the virtual reference point.

7. The method of claim 6 wherein the virtual world is a recreation of the physical world in proximity to the first user.

8. An information handling system comprising:
one or more processors;
a memory coupled to at least one of the processors;
a set of computer program instructions stored in the memory and executed by at least one of the processors in order to perform actions of:

establishing a communication link between a virtual reality device and a hologram system, wherein the virtual reality device projects a virtual hologram in a virtual world viewable to a first user operating the virtual reality device, and the hologram system projects a hologram corresponding to the virtual hologram in a physical world viewable to a second user;

receiving a request from the first user operating the virtual reality device to adjust the virtual hologram;

adjusting, by the virtual reality device, the virtual hologram in the virtual world; and sending a set of instructions from the virtual reality device to the hologram system that instructs the hologram system to adjust the hologram in the physical world based upon the adjusting of the virtual hologram, wherein the adjusted hologram is viewable by the second user.

9. The information handling system of claim 8 wherein the processors perform additional actions comprising:

re-adjusting the hologram in the physical world by the hologram system based on a re-adjustment request initiated by the second user; and sending a different set of instructions from the hologram system to the virtual reality device that instructs the virtual reality device to re-adjust the virtual hologram based upon the re-adjusting of the hologram.

10. The information handling system of claim 8 wherein the processors perform additional actions comprising:

resizing the virtual hologram by the virtual reality device; and resizing the hologram by the hologram system in proportion to the resizing of the virtual hologram by the virtual reality device.

11. The information handling system of claim 10 further comprising a plurality of virtual reality devices each displaying one of a plurality of corresponding virtual holograms, and where each of the plurality of virtual reality devices resize their corresponding one of the plurality of corresponding virtual holograms.

12. The information handling system of claim 8 wherein the processors perform additional actions comprising:

receiving a mapping of the physical world from a set of internet of things (IoT) devices; and generating the virtual world based on the received mapping.

13. The information handling system of claim 8 wherein the processors perform additional actions comprising:

identifying a physical reference point of the hologram in the physical world;

utilizing the reference point and a virtual position of the first user in the virtual world to establish a virtual reference point in the virtual world; and displaying the virtual hologram in the virtual world at the virtual reference point.

14. The information handling system of claim 13 wherein the virtual world is a recreation of the physical world in proximity to the first user.

15. A computer readable storage medium comprising a computer program product, wherein the computer program product comprises computer program code that, when executed by an information handling system, causes the information handling system to perform actions comprising:

establishing a communication link between a virtual reality device and a hologram system, wherein the virtual reality device projects a virtual hologram in a virtual world viewable to a first user operating the virtual reality device, and the hologram system projects a hologram corresponding to the virtual hologram in a physical world viewable to a second user;

receiving a request from the first user operating the virtual reality device to adjust the virtual hologram;

adjusting, by the virtual reality device, the virtual hologram in the virtual world; and sending a set of instructions from the virtual reality device to the hologram system that instructs the hologram system to adjust the hologram in the physical world based upon the adjusting of the virtual hologram, wherein the adjusted hologram is viewable by the second user.

16. The computer readable storage medium of claim 15 wherein the information handling system performs further actions comprising:

re-adjusting the hologram in the physical world by the hologram system based on a re-adjustment request initiated by the second user; and sending a different set of instructions from the hologram system to the virtual reality device that instructs the virtual reality device to re-adjust the virtual hologram based upon the re-adjusting of the hologram.

17. The computer readable storage medium of claim 15 wherein the information handling system performs further actions comprising:

resizing the virtual hologram by the virtual reality device; and resizing the hologram by the hologram system in proportion to the resizing of the virtual hologram by the virtual reality device.

18. The computer readable storage medium of claim 17 further comprising a plurality of virtual reality devices each displaying one of a plurality of corresponding virtual holograms, and where each of the plurality of virtual reality devices resize their corresponding one of the plurality of corresponding virtual holograms.

19. The computer readable storage medium of claim 15 wherein the information handling system performs further actions comprising:

receiving a mapping of the physical world from a set of internet of things (IoT) devices; and generating the virtual world based on the received mapping.

20. The computer readable storage medium of claim 15 wherein the information handling system performs further actions comprising:

identifying a physical reference point of the hologram in the physical world;

utilizing the reference point and a virtual position of the first user in the virtual world to establish a virtual reference point in the virtual world; and displaying the virtual hologram in the virtual world at the virtual reference point.

* * * * *